(12) United States Patent  
Moran et al.

(10) Patent No.: US 12,147,326 B2
(45) Date of Patent: Nov. 19, 2024

(54) BEHAVIORAL SENSOR FOR CREATING CONSUMABLE EVENTS

(71) Applicant: Arm Limited, Cambridge (GB)

(72) Inventors: Brendan James Moran, Histon (GB); Hugo John Martin Vincent, Cambridge (GB); Michael Bartling, Austin, TX (US)

(73) Assignee: ARM LIMITED, Cambridge (GB)

( * ) Notice: Subject to any disclaimer, the term of this patent is extended or adjusted under 35 U.S.C. 154(b) by 27 days.

(21) Appl. No.: 17/887,927

(22) Filed: Aug. 15, 2022

(65) Prior Publication Data

US 2024/0054065 A1    Feb. 15, 2024

(51) Int. Cl.
  *G06F 11/34*    (2006.01)
  *G06F 18/21*    (2023.01)

(52) U.S. Cl.
  CPC ........ *G06F 11/3495* (2013.01); *G06F 18/217* (2023.01)

(58) Field of Classification Search
  CPC ............................ G06F 11/3495; G06F 18/217
  See application file for complete search history.

(56) References Cited

U.S. PATENT DOCUMENTS

| | | | |
|---|---|---|---|
| 2007/0233628 A1* | 10/2007 | Sherwood | H04L 45/00 706/46 |
| 2008/0183430 A1 | 7/2008 | Kitsunai et al. | |
| 2008/0301124 A1 | 12/2008 | Alves et al. | |
| 2015/0293954 A1 | 10/2015 | Hsiao et al. | |
| 2016/0306678 A1* | 10/2016 | Hira | G06F 9/5083 |
| 2017/0041688 A1 | 2/2017 | Pitigoi-Aron et al. | |
| 2018/0217914 A1* | 8/2018 | Sawada | G05B 19/058 |
| 2019/0205185 A1 | 7/2019 | Alfred et al. | |
| 2020/0183583 A1* | 6/2020 | Kachare | G06F 3/061 |

(Continued)

FOREIGN PATENT DOCUMENTS

| | | |
|---|---|---|
| CN | 112363891 A | 2/2021 |
| WO | 2013095429 A1 | 6/2013 |
| WO | 2018215062 A1 | 11/2018 |

OTHER PUBLICATIONS

Tobiyama, Shun et al., "A method for estimating process maliciousness with Seq2Seq model," 2018 International Conference on Information Networking (ICOIN), Jan. 10, 2018, pp. 255-260, IEEE, Chiang Mai, Thailand.

(Continued)

*Primary Examiner* — Anh Nguyen
(74) *Attorney, Agent, or Firm* — Talem IP Law, LLP

(57) ABSTRACT

A behavioral sensor for creating consumable events can include: a feature extractor coupled to receive an event stream of events performed by a circuit, wherein the feature extractor identifies features of a particular event of the event stream and associates the particular event with a time; and a classifier coupled to receive the features of the particular event from the feature extractor, wherein the classifier classifies the particular event into a classified event associated with the time using predefined categories based on the received features of the particular event; whereby the classified event and subsequent classified events extracted from the event stream within a time frame are appended in a time series forming the consumable events.

18 Claims, 4 Drawing Sheets

(56) References Cited

U.S. PATENT DOCUMENTS

2022/0345215 A1* 10/2022 Ye .................. H04B 10/0791

OTHER PUBLICATIONS

Morrill, James et al., "A Generalised Signature Method for Multivariate Time Series Feature Extraction," Feb. 6, 2021 (Accessible: Jun. 1, 2020), 22 pages, arXiv.
International Search Report and Written Opinion issued in International Application No. PCT/GB2023/051946, mailed Oct. 10, 2023, 19 pages.

* cited by examiner

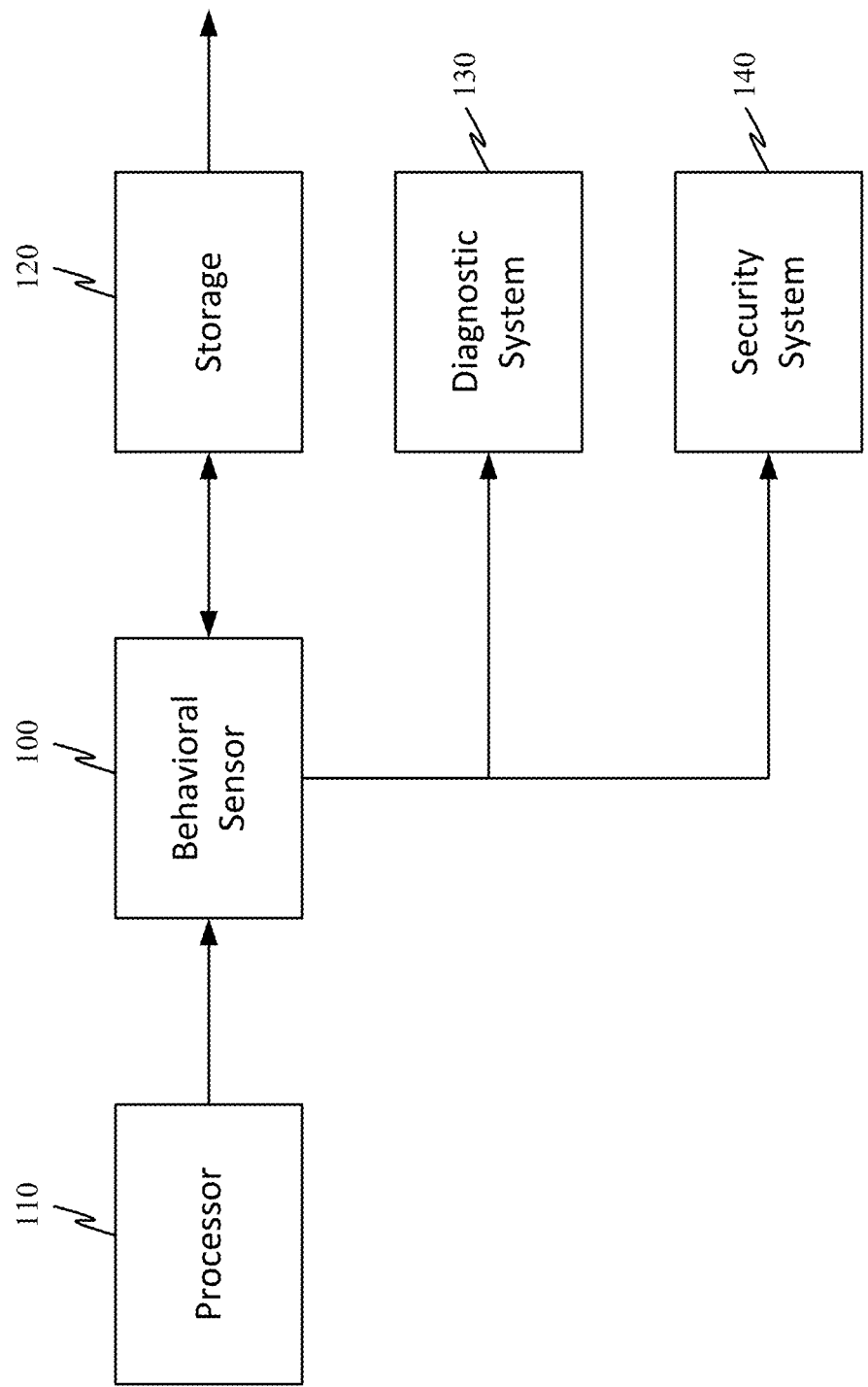

BEHAVIORAL SENSOR FOR CREATING CONSUMABLE EVENTS

BACKGROUND

Central Processing Units (CPUs) with performance monitoring capability such as a performance monitoring unit (PMU) have the capacity to produce detailed information about the operations performed by the CPU. This detailed information is typically tracked in terms of 'events,' which are the result of processor execution, particularly negative results, such as branch miss, cache miss but also in terms of positive events, such as completed (retired) instructions, for example branches, stores and loads retired. Unfortunately, modem processors run at extremely high speeds so, even if only some results of processor execution are tracked, there are still millions of events produced every second, if not more.

The high number of events (e.g., millions of events) that are produced in the short amount of time (e.g., in a second) can make it difficult for other devices or processes to consume the information. One approach taken by certain PMUs is to aggregate events, for example using counters or accumulators which count up every type of event in a predetermined time (typically on the order of a million cycles). Unfortunately, the approach of using accumulators to count up events in a given timeframe discards fine temporal information and the order of events—both of which may be important for the devices or processes that are to consume the information.

BRIEF SUMMARY

A behavioral sensor for creating consumable events is provided. Behavior of a circuit such as a processor or other device, including the success of commands or particular operations, can be represented as a series of events in an event stream. The described behavioral sensor can be used to interpret events in the event stream and curate the interpreted events in a more immediately consumable fashion. Finer temporal fidelity can be achieved by associating individual events from an event stream with a time. Once associated, the events associated with the times can be organized in a consumable time series. The time series can be better used by moderation or diagnostic components to more accurately understand the inner workings of the processor or other device.

A behavioral sensor for creating consumable events can include: a feature extractor coupled to receive an event stream of events performed by a circuit, wherein the feature extractor identifies features of a particular event of the event stream and associates the particular event with a time; and a classifier coupled to receive the features of the particular event from the feature extractor, wherein the classifier classifies the particular event into a classified event associated with the time using predefined categories based on the received features of the particular event; whereby the classified event and subsequent classified events extracted from the event stream within a time frame are appended in a time series forming the consumable events.

A method of creating consumable events can include receiving an event stream of events performed by a circuit; identifying features of a particular event of the event stream; associating the particular event with a time; classifying the particular event into a classified event associated with the time using predefined categories; and appending the classified event associated with the time to a time series forming the consumable events.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 illustrates an operating environment for a behavioral sensor for creating consumable events.

DETAILED DESCRIPTION

Figures 2A, 2B:
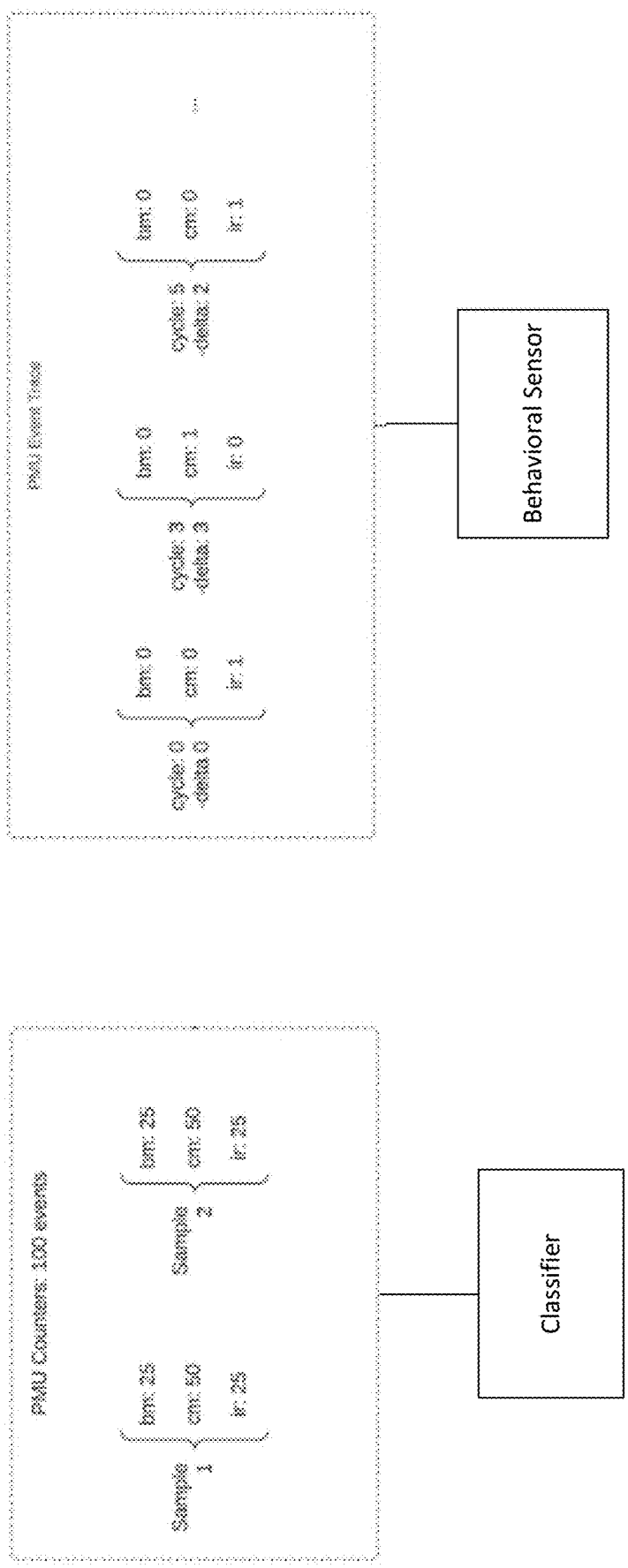
FIGS. 2A and 2B illustrate an operation of generating consumable events from PMUs as compared to aggregated events.

A behavioral sensor for creating consumable events is provided. Behavior of a circuit such as a processor or other device, including the success of commands or particular operations, can be represented as a series of events in an event stream. The described behavioral sensor can be used to interpret events in the event stream and curate the interpreted events in a more immediately consumable fashion. Finer temporal fidelity can be achieved by associating individual events from an event stream with a time. Once associated, the events associated with the times can be organized in a consumable time series. The time series can be better used by moderation or diagnostic components to more accurately understand the inner workings of the processor or other device.

FIG. 1 illustrates an operating environment for a behavioral sensor for creating consumable events. A behavioral sensor 100 can receive an event stream of events related to actions of a circuit such as a processor 110. Although specific reference is made to a processor 110, the processor can be any processing element such as, but not limited to, a CPU, graphics processing unit (GPU), microcontroller, or computing unit (e.g., multiplier-accumulator (MAC) unit with memory). Similarly, it should be understood that the behavioral sensor (e.g., behavioral sensor 100) can receive events from (and be used to create consumable events from) other circuits such as, but not limited to, memory controllers, cache controllers, bus interface units (e.g., PCLe), network interface controllers, mixed signal blocks (e.g., used for radio interface), and digital filters. Behavioral sensor 100 can be implemented as described with respect to sensor 300 of FIG. 3. The event stream of events can, for example, be a bit stream produced by a PMU that monitors and records actions of the processor. The events can describe issues that occur during execution of commands from the processor 110. Events can include, but are not limited to, branch mis-predict, load retired, store retired, branch retired, and cache miss. Events may be 1-bit information or multi-bit signals (e.g., 2-bits, 3-bits). Events can be PMU events, come from a variety of sources, or may be derived from combinations of existing sources. The behavioral sensor 100 can process events of the event stream to create consumable events, for example, as described with respect to method 400 of FIG. 4. Consumable events can be stored in storage 120 or immediately used by another system or device.

For example, the consumable events generated by the behavioral sensor 100 can be provided to or obtained by a diagnostic system 130 or a security system 140. A diagnostic system 130 refers to a system that evaluates the processor for performance and/or debug. Performance tuning involves altering system parameters to improve behavior of computational systems (e.g., processors) based on predicted workload. Debugging involves identifying known flow patterns in program behavior and can be conducted as part of the post-manufacturing process before shipping the processor. A security system 140 provides security monitoring to identify potential attacks on the processor.

The diagnostic system 130 can analyze the set of consumable events to determine if there's an issue and, if so, what the issue might be. One application of a diagnostic system 130 involves power management where efficiency of a workload can be optimized as the processor is operating. For example, in performance tuning applications, the diagnostic system 130 analyzes the set of consumable events to see the result of different loads applied to the processor 110. Based on the result of different loads applied to the processor 110, the diagnostic system 130 can provide feedback to the processor 110 to alter processor function based on a change in either a frequency of events or type of event. As another example, in debugging applications, the diagnostic system 130 analyzes the set of consumable events such that known flaw patterns of processor execution can be identified and iteratively tested.

The security system 140 can review the set of consumable events to determine if an attack is occurring or has occurred and implement countermeasures at the processor 110. The security system 140 can, for example, be configured to detect patterns of classified events known to exhibit attack characteristics, potentially in real time. If the security system 140 determines that an attack is in progress, mitigations can be triggered directly, such as direct feedback to the processor 110 (e.g., which terminates the application) or a monitoring system (either on or off a system-on-chip on which the behavioral sensor 100 and processor 110 are located) or otherwise create or raise alerts. The alerts can be used in further applications for tuning and other improvements.

As mentioned above, instead of aggregating/counting events, the behavioral sensor 100 is able to produce consumable events that maintain temporal information and the order of events, which benefits a variety of applications.

FIGS. 2A and 2B illustrate an operation of generating consumable events from PMUs as compared to aggregated events. A specific example of an event stream includes events produced by PMUs that are monitoring a processor. Referring to FIG. 2A, in an illustrative example of a scenario generating aggregated events tracking branch mis-predict (bm), cache miss (cm), and instruction retire (ir), a counter at a PMU can aggregate event information over, for example, 100 events and results are classified by a classifier. A first sample of 100 events shows 25 bm, 50 cm, and 25 ir. A second sample of 100 events shows a similar 25 bm, 50 cm, and 25 ir. The classifier can be used to identify whether the samples reflect known patterns. In contrast, referring to FIG. 2B, a behavioral sensor as described herein captures temporal and order information. In the illustrative scenario where branch mis-predict (bm), cache miss (cm), and instruction retire (ir) are tracked, information from the event trace is used to generate the consumable events by the behavioral sensor. Here, each cycle in which a tracked event occurs is captured and appended with information indicative of time. As an optimization approach, the information indicative of time can be a delta value of a number of cycles since a previous event. For example, a first incident of a tracked event (an ir) during a sample/time frame is assigned a time 0. The next incident of a tracked event (in this case a cm), which occurs at cycle 3, is assigned a time delta of 3. The next incident of a tracked event (in this case an ir), which occurs at cycle 5, is assigned a time delta of 2 (which is the number of cycles since the last event). The behavioral sensor can store the information as an event vector with bits indicative of the time value for the tracked event(s).

Figure 3:
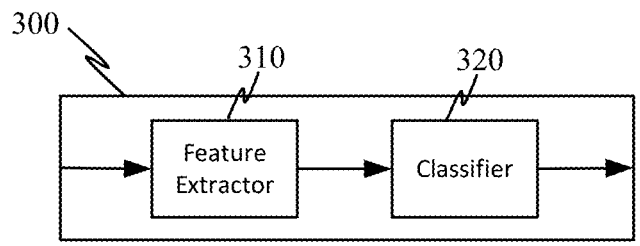
FIG. 3 illustrates a representational schematic of a behavioral sensor for creating consumable events.

FIG. 3 illustrates a representational schematic of a behavioral sensor for creating consumable events. Referring to FIG. 3, a behavioral sensor 300 includes a feature extractor 310 and a classifier 320. The feature extractor 310 can be coupled to a processor (or other device) to receive an event stream of events performed by a processor. The feature extractor 310 identifies features of a particular event of the event stream and associates the particular event with a time. In some cases, a buffer (not shown) is used to capture information before being acted upon by the feature extractor 310. In some cases, a robust feature extractor is used that can handle direct receipt of events from an event trace.

The feature extractor 310 can be implemented as a programmable binary state machine, a binary pattern matching engine, a bitstream pattern matcher, a path signature extractor, digital filters, statistical calculators, or other suitable circuitry (including more robust/complex circuitry with or without acceleration). A programmable binary state machine is a simple state machine that examines the event bit-by-bit and based on a traversal of the state machine, notates one or more features. A bitstream pattern matcher compares larger sections of the event than a single bit and may even compare the entirety of the event. A bitstream pattern matcher can be embodied as a series of enabled circuits that are configured to particular bitstreams. A path signature extractor uses high-dimensional data associated with a series of events to produce a unique signature of a path representing important aspects relating to that series of events.

As mentioned above, the feature extractor 310 identifies features of a particular event of the event stream and associates the particular event with a time. The features can be for any event of interest. For example, the features of the particular event can include at least two features monitored by a PMU (e.g., at least two from a set of features that can include branch mis-predict, load retired, store retired, branch retired, and cache miss). The time can be measured using a counter, which can be part of the behavioral sensor or maintained externally (e.g., as part of the processor). In some cases, the time can be an absolute measure, for example, the hour, minute, second, and date of the event. In other cases, the time can be a relative measure, for example using delta compression (see e.g., example of FIG. 2B). In delta compression, the value of the relative time difference can be stored—the difference between the current event and previous event can be expressed by the number of empty or unused cycles—for example, 3 cycles after the previous event. In the case of relative measure, in some cases the number of cycles can have some ceiling value, for example 1,000 cycles (e.g., even if there were 10,000 cycles between consecutive reported events, the relative time would be reported and saved as 1,000 cycles). This can be done, for example, by using a saturating counter to count the time between events.

The classifier 320 is coupled to the feature extractor 310 to receive the features of the particular event from the feature extractor 310. The classifier 320 classifies the particular event into a classified event associated with the time using predefined categories based on the received features of the particular event. The classification to predefined categories can include confidence values such that the classification is not simply a binary determination (e.g., belonging to the category or not belonging to the category) but quantizes a classification measure (e.g., a value between 0 and 255, inclusive, where 0=definitely not belonging to the category and 255=definitely belong to the category. The classified event and subsequent classified events extracted from the event stream by the feature extractor 310 within a time frame are appended in a time series forming the consumable events. In some cases, the output of the classifier 320 are in a form of labeled vectors (e.g., values associated with each, or a subset of, the predefined categories). The classifier 320 can be nearest neighbor classifier/approximate nearest neighbor classifier, a decision tree classifier, a support vector machine, or other suitable classifier. In some cases, the classifier 320 can include behavioral locality sensitive hashing (bLSH), which are locality sensitive hashes and hash table lookup for approximate nearest neighbor search or extreme gradient boosting (Xg-boost). A designated processor may be used to implement the classifier 320. The consumable events output from the behavioral sensor 300 after classification by the classifier 320 are temporal classified events.

Figure 5:
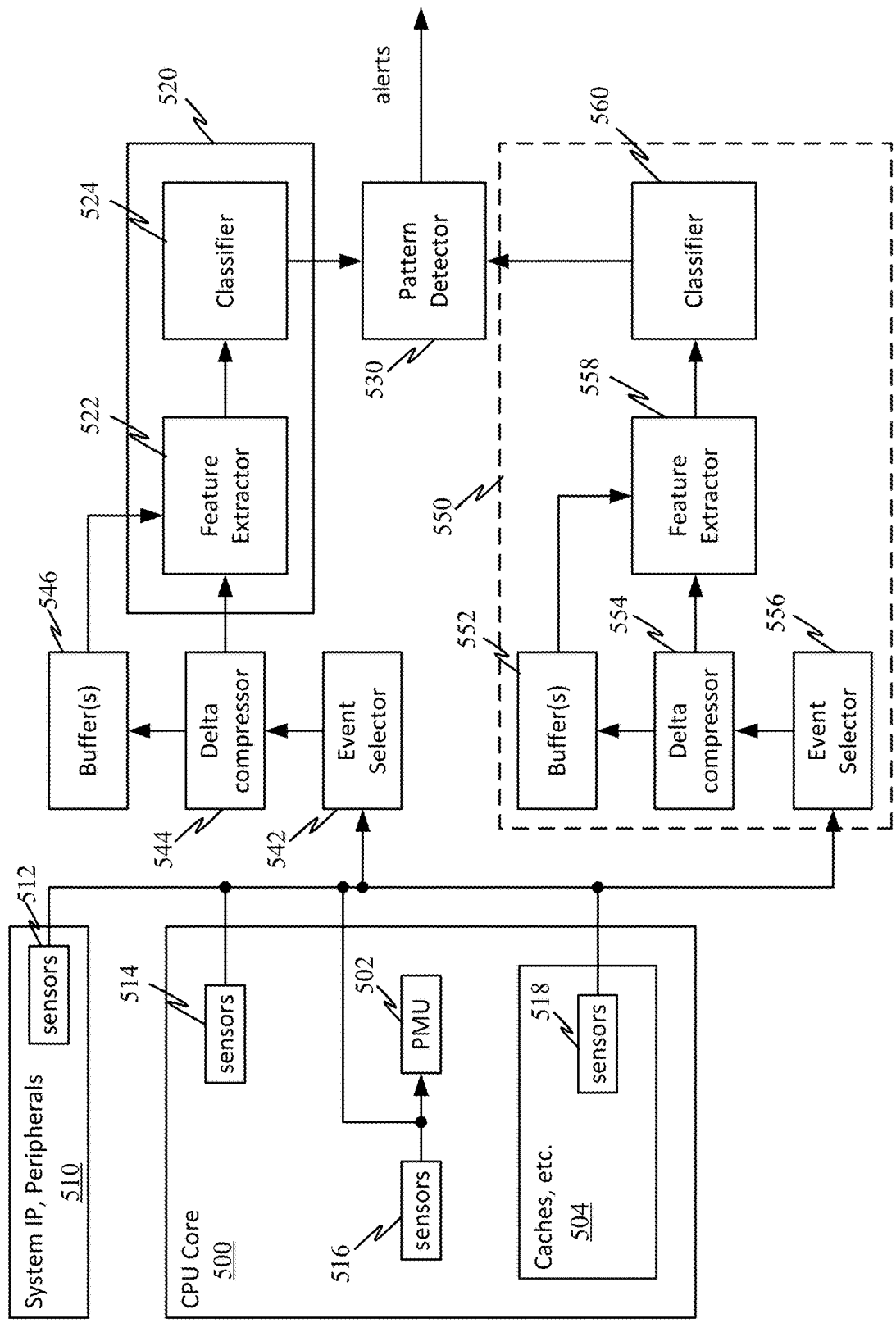
FIG. 5 illustrates a specific implementation of a system with a behavioral sensor for creating consumable events.

While certain implementations of a behavioral sensor 300 include only a feature extractor 310 and classifier 320, other implementations can include additional circuitry and/or subsystems, for example as described with respect to FIG. 5. In some cases, it is possible to output or otherwise obtain intermediate values of the behavioral sensor 300, for example, where output of the feature extractor 310 is exportable.

Figure 4:
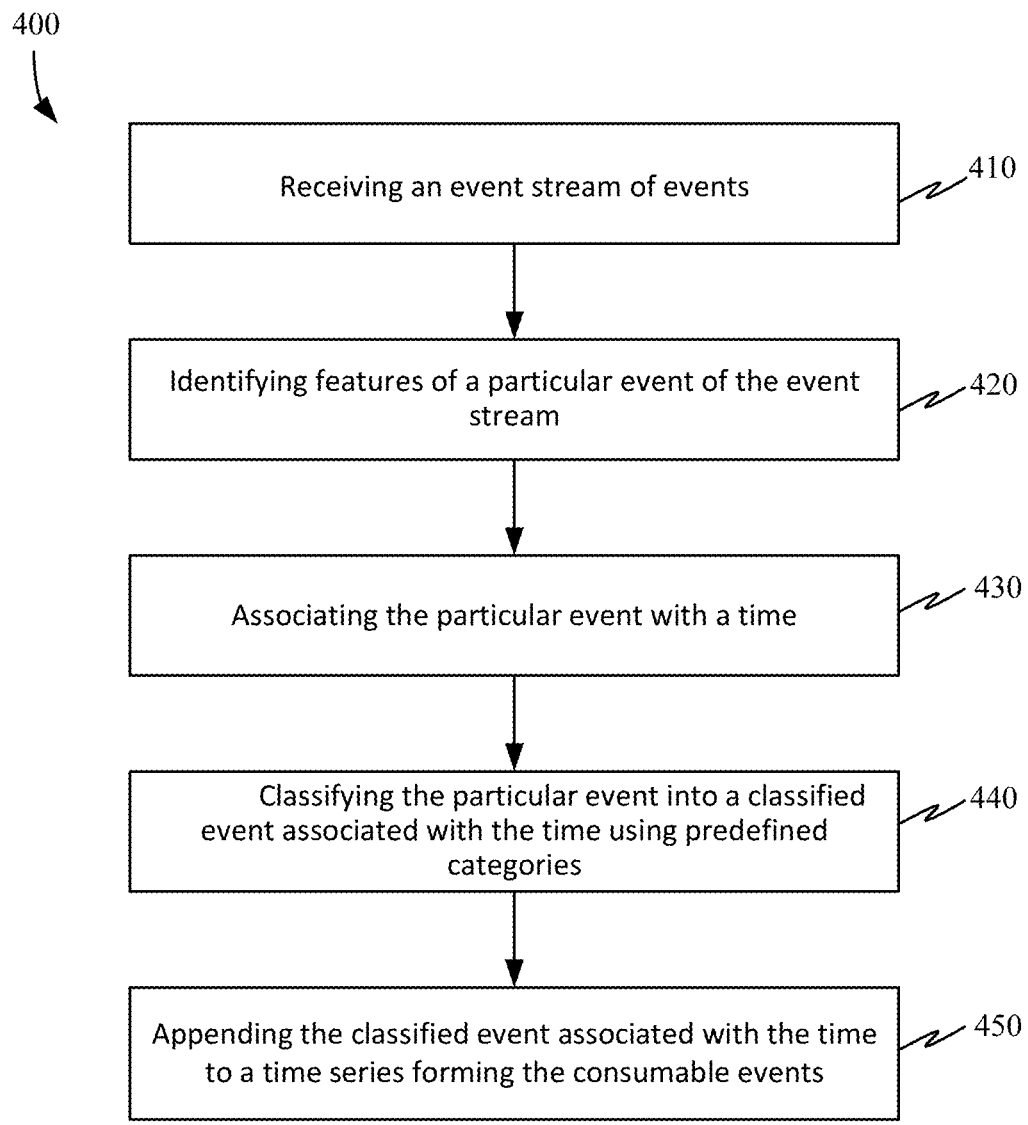
FIG. 4 shows a method of creating consumable events.

FIG. 4 shows a method of creating consumable events. Referring to FIG. 4, a method 400 of creating consumable events can include receiving (410) an event stream of events; identifying (420) features of a particular event of the event stream; associating (430) the particular event with a time; classifying (440) the particular event into a classified event associated with the time using predefined categories; and appending (450) the classified event associated with the time to a time series forming the consumable events.

Method 400 can be carried out by a behavioral sensor (e.g., behavioral sensor 300 of FIG. 3). For example, feature extractor 310 can receive (410) the event stream of events performed by a processing element or other circuit, identify (420) features of the particular event of the event stream, and associate (430) the particular event with a time. The time can later be used as an index for a time series. In some cases, identifying (420) features of a particular event can include comparing bits of the particular event against known bit patterns that identify particular features. Example features of events can include branch mis-predict, cache miss, and loads retired.

Classifier 320 can then be used to classify (440) the particular event into a classified event associated with the time using predefined categories; the classified event associated with the time then being appended (450) to a time series forming the consumable event. In some cases, the classification is performed using an approximate nearest neighbor algorithm. The approximate nearest neighbor algorithm can use a similarity function to determine the closest category to a set of features by minimizing the "distance" values (in other words how much the category resembles the set of features) among potential categories.

As described with respect to FIG. 1, the consumable events can be used by a variety of systems. For example, the time series generated by method 400 can be sent to a diagnostic system 130 to perform an analysis on the time series to determine any issues present, either within the code or the circuitry. In some cases, only a portion of the time series is sent. For example, the time series can be sent once a predetermined number of cycles has been passed. In other cases, the time series can be sent based on execution of commands of the processor. For example, the time series can be sent after the processor 110 executes an entire functional block of code or at specific time defined in code.

As another example, the time series can be sent to a security system 140 that examines the time series for potential activity indicating an attack is or was present. Transmission of the time series can occur similarly to transmission to the diagnostic system 130 (e.g. in part or in totality, at certain times).

The method 400 can further include grouping certain received events of the event stream before forming the consumable events. For example, grouping certain received events of the event stream can include grouping the received events of the event stream according to exception level, process identifier, thread identifier, or a combination thereof. That is, in some cases, events received by the behavioral sensor are able to be grouped by exception level and/or process ID (or thread ID where processes are not used such as in a kernel).

An exception level refers to a privilege level with respect to software execution (e.g., availability of and access to storage and to processor functionality). There are a number of different types of exception levels including, but not limited to, secure monitor, hypervisor, kernel, user, trusted kernel, and trusted application.

The exception level is present in a particular hardware and an exception level change can be recordable as an event. For the process ID or thread ID, additional harvesting/reporting functionality can be included.

The sensor can collect certain information/events which may be stored in certain storage resources (e.g., registers, buffers) or is provided the information. For example, a scheduler of a processor can report to the behavioral sensor that information (e.g., a process identifier or thread identifier) is available in a particular resource. As a specific illustration, the Linux operating system provides a configuration option: CONFIG_PID_IN_CONTEXTIDR, which places the Process ID in a CPU register called Context IDR. The sensor can receive or otherwise obtain the Process ID from the CPU register.

FIG. 5 illustrates a specific implementation of a system with a behavioral sensor for creating consumable events. Referring to FIG. 5, a computing system can include a CPU core 500 and system interfaces and peripherals 510. The CPU core 500 can include a PMU 502 and memory 504. The CPU core 500 can execute commands/instructions stored in the memory 504. As commands/instructions are performed, certain activities, operations, and behaviors at the CPU core 500 and the system interfaces and peripherals 510 may be considered events.

A number of sensors can be distributed throughout the computing system to detect various events and states. For example, one or more sensors 512 can be located at the system interfaces and peripherals 510, one or more sensors 514 can be located at the CPU core 500, one or more sensors 516 can be at the CPU core 500 for monitoring by the PMU 502, and one or more sensors 518 can be located associated with memory 504 (e.g., caches and memory management, etc.). In the illustrated scenario a behavioral sensor 520 is included to create consumable events from the events detected by the various sensors 512, 514, 516, 518 for a pattern detector 530 used for security alerts.

Behavioral sensor 520 includes feature extractor 522 and classifier 524, which can be configured as described with respect to the behavioral sensor 300 of FIG. 3. Preprocessing circuitry can be included (and considered part of behavioral sensor 520 or part of the coupling circuitry to the processor/CPU core 500). The preprocessing circuitry can include an event selector 542, a cycle delta compressor 544, and one or more buffers 546. Of course, certain embodiments may omit one or more of these circuit elements and certain embodiments may include additional circuit elements in addition to or in place of the event selector 542, cycle delta compressor 544, and one or more buffers 546.

The event selector 542 can receive input of events of the event stream from one or more sources (e.g., from any of sensors 512, 514, 516, 518) and selects events based on one or more criteria. The criteria can include type of processor commands, number of cycles, or other predefined constraints. The event selector 542 is used to constrain the complexity of the feature extractor 522 so that the feature extractor 522 works from a subset of signals. That is, the event selector 542 provides a reduced event stream to the feature extractor 522. The event selector 542 can be embodied as a multiplexor, wherein a select line of the multiplexor can determine whether to allow an event on a bus line of the multiplexor to pass. The select pin can be controlled externally, for example by a processor that strobes to only allow certain events to pass. In other instances, the select pin can be coupled to a particular sensor or PMU to only allow events from particular sources. In other cases, a particular bit of the event can be fed to the select pin (e.g., an event comprising of seven bits can include six bits of data about the event and one bit that is used as a flag). In another implementation, the event selector can be a bit-mask that merges multiple sources of events into a single bitstream (e.g., combining loads and stores into a single "load or store" event).

The cycle delta compressor 544 can be used when relative time is used as the time value in the time series to determine the number of cycles between valid events (see e.g., FIG. 2B). Because CPUs do not generate events on every cycle, the delta compressor 544 can be used to compress 0-space with run-length-encoding. That is, the delta compressor 544 can count the number of empty samples and save this delta as the cycle delta from the previous non-empty sample. In this manner, the cycle delta compressor 544 generates a count of a number of empty cycles between events of the event stream. The delta compressor 544 can include a counter (e.g., in the form of a number of flip-flops connected in cascade). The counter can be regularly incremented, for example by a clock circuit. When a valid event is received, the counter can be read and the value (that is the differential in time between two valid events) can be stored as the time and forwarded with the event. The counter can then be reset. In some cases, the counter used in the delta compressor 544 can be a saturating counter, wherein a ceiling value is included, beyond which the counter cannot increment. For example, the ceiling value can be 1,000 cycles—if an event were to occur more than 1,000 cycles after an immediately previous valid event, then a value of 1,000 cycles can be assigned as the time despite the actual number of cycles being greater than 1,000.

The one or more buffers 546 can serve to slow down receipt of events. In some cases, events are produced at a greater rate than can be processed by the feature extractor 522 or classifier 524. To prevent these events from being discarded or conflicting with events currently being processed, a buffer 546 can be used to store events until the feature extractor 522 or classifier 524 are ready. The buffer 546 can be, for example, a digital buffer, storage resource, static random-access memory (SRAM), or flip-flop circuit. In some cases, the buffer 546 automatically pushes received events to the feature extractor 522, and, in other cases, the buffer 546 receives a signal from the feature extractor 522 or the classifier 524 that indicates that the previous event has been processed by one or both of the feature extractor 522 and the classifier 524. In some cases, there may be an additional buffer between the feature extractor 522 and the classifier 524.

Additional event collection systems 550 can be included as part of the system (with consumable events provided to the pattern detector 530), each including their own buffers 552, cycle delta compressor 554, event selector 556, feature extractor 558, and classifier 560.

Pattern detector 530 can be considered a security system such as described in FIG. 1. In some cases, pattern detector 530 can be a higher order machine learning or statistical system implemented, for example, with neural networks, deep learning techniques. Pattern detector 530 can perform high-level decisions on mitigation and reporting.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A behavioral sensor for creating consumable events comprising:
a feature extractor comprising circuitry coupled to receive an event stream of events performed by a circuit, wherein the feature extractor identifies features of a particular event of the event stream and associates the particular event with a time; and
a classifier comprising a processor coupled to receive the features of the particular event from the feature extractor, wherein the classifier classifies the particular event into a classified event associated with the time using predefined categories based on the received features of the particular event; and
an event selector coupled to the feature extractor to provide a reduced event stream to the feature extractor; whereby the classified event and subsequent classified events extracted from the event stream within a time frame are appended in a time series forming the consumable events.

2. The behavioral sensor of claim 1, wherein the circuit is a processing element.

3. The behavioral sensor of claim 2, wherein the processing element is a central processing unit (CPU).

4. The behavioral sensor of claim 1, wherein the event selector is a multiplexor that receives input of events of the event stream from one or more sources and selects a subset of events from the event stream based on one or more criteria.

5. The behavioral sensor of claim 1, wherein the event selector comprises a bit-mask that merges multiple sources of events into a single event stream.

6. The behavioral sensor of claim 1, further comprising a cycle delta compressor coupled between the circuit and the feature extractor, wherein the cycle delta compressor generates a count of a number of empty cycles between events of the event stream.

7. The behavioral sensor of claim 1, further comprising a counter to count a number of cycles between instances of events, the number of cycles between instances of events being the time associated with the particular event.

8. The behavioral sensor of claim 7, wherein the counter is a saturating counter that has a ceiling value.

9. The behavioral sensor of claim 1, wherein the feature extractor comprises a programmable binary state machine.

10. The behavioral sensor of claim 1, wherein the feature extractor comprises a binary pattern matching engine.

11. The behavioral sensor of claim 1, wherein the feature extractor comprises a path signature extractor.

12. The behavioral sensor of claim 1, wherein the features of the particular event include at least two features monitored by a performance monitoring unit (PMU).

13. The behavioral sensor of claim 1, wherein the classifier comprises an approximate nearest neighbor classifier.

14. A method of creating consumable events comprising:
receiving an event stream of events performed by a circuit;
selecting events from the event stream based on a criteria to provide a reduced event stream;
identifying features of a particular event of the reduced event stream;
associating the particular event with a time;
classifying the particular event into a classified event associated with the time using predefined categories; and
appending the classified event associated with the time to a time series forming the consumable events.

15. The method of creating consumable events of claim 14, wherein classifying the particular event comprises performing an approximate nearest neighbor algorithm on the particular event.

16. The method of creating consumable events of claim 14, wherein associating the particular event with the time comprises associating a relative time for the particular event, the relative time being a number of cycles since a previous cycle containing an event.

17. The method of creating consumable events of claim 14, further comprising grouping certain received events of the event stream before forming the consumable events.

18. The method of creating consumable events of claim 17, wherein grouping certain received events of the event stream comprises grouping the received events of the event stream according to exception level, process identifier, thread identifier, or a combination thereof.

* * * * *